(12) United States Patent
Shimamura

(10) Patent No.: US 10,948,812 B2
(45) Date of Patent: Mar. 16, 2021

(54) LIGHT SOURCE UNIT AND PROJECTOR

(71) Applicant: CASIO COMPUTER CO., LTD., Tokyo (JP)

(72) Inventor: Takatoshi Shimamura, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/451,776

(22) Filed: Jun. 25, 2019

(65) Prior Publication Data
US 2020/0004121 A1    Jan. 2, 2020

(30) Foreign Application Priority Data

Jul. 2, 2018 (JP) .............................. JP2018-125706
May 14, 2019 (JP) .............................. JP2019-091588

(51) Int. Cl.
*G03B 21/20* (2006.01)

(52) U.S. Cl.
CPC ....... *G03B 21/204* (2013.01); *G03B 21/2013* (2013.01); *G03B 21/2066* (2013.01); *G03B 21/2073* (2013.01)

(58) Field of Classification Search
CPC .... G03B 21/28; G03B 21/204; G03B 21/208; G03B 21/2013; G03B 21/2033;
(Continued)

(56) References Cited

U.S. PATENT DOCUMENTS

| 4,653,867 A | 3/1987 | Urabe et al. |
| 8,807,758 B2 | 8/2014 | Miyazaki |

(Continued)

FOREIGN PATENT DOCUMENTS

| CN | 104603689 A | 5/2015 |
| JP | 60262130 A | 12/1985 |

(Continued)

OTHER PUBLICATIONS

Japanese Office Action (and English language translation thereof) dated Nov. 5, 2020 issued in counterpart Japanese Application No. 2019-091588.

(Continued)

*Primary Examiner* — Sultan Chowdhury
(74) *Attorney, Agent, or Firm* — Holtz, Holtz & Volek PC

(57) ABSTRACT

A light source unit of the invention includes a light source device including first and second light sources held by a holding member, each light source being configured to emit light in a predetermined polarizing direction, a first reflection device on which light from the first light source is incident, a second reflection device on which reflection light from the first reflection device and light from the second light source are incident, and a light source control device configured to selectively drive the first and second light sources in response to an input signal, and the first reflection device reflects light in the polarizing direction incident thereon from the first light source, while the second reflection device transmits light in the polarizing direction reflected by the first reflection device for incidence thereon and reflects light in the polarizing direction from the second light source for incidence thereon.

32 Claims, 5 Drawing Sheets

(58) Field of Classification Search
CPC ............ G03B 21/2053; G03B 21/2066; G03B 21/2073; F21V 9/14; F21V 9/20; F21V 9/30
See application file for complete search history.

(56) References Cited

U.S. PATENT DOCUMENTS

| | | | | |
|---|---|---|---|---|
| 8,833,944 | B2* | 9/2014 | Katou | G03B 33/12 |
| | | | | 353/31 |
| 9,599,316 | B2 | 3/2017 | Yamada et al. | |
| 9,946,143 | B1 | 4/2018 | Akiyama | |
| 10,012,894 | B2 | 7/2018 | Sato et al. | |
| 10,060,602 | B2 | 8/2018 | Akiyama | |
| 2009/0009720 | A1* | 1/2009 | Chen | G02B 27/283 |
| | | | | 353/20 |
| 2012/0019783 | A1* | 1/2012 | Imai | G02B 27/283 |
| | | | | 353/20 |
| 2014/0192331 | A1* | 7/2014 | Toyooka | G03B 21/006 |
| | | | | 353/85 |
| 2017/0184951 | A1 | 6/2017 | Kurosaki | |
| 2018/0066828 | A1* | 3/2018 | Akiyama | F21V 14/08 |
| 2018/0088452 | A1* | 3/2018 | Tajiri | H04N 9/3158 |
| 2019/0155135 | A1* | 5/2019 | Imae | H04N 5/74 |

FOREIGN PATENT DOCUMENTS

| | | |
|---|---|---|
| JP | 11064793 A | 3/1999 |
| JP | 2000121836 A | 4/2000 |
| JP | 2008256979 A | 10/2008 |
| JP | 2012141581 A | 7/2012 |
| JP | 2012181260 A | 9/2012 |
| JP | 2016186566 A | 10/2016 |
| JP | 2017015993 A | 1/2017 |
| JP | 2017116681 A | 6/2017 |
| JP | 2017142904 A | 8/2017 |
| JP | 2017151293 A | 8/2017 |
| JP | 2018040881 A | 3/2018 |
| JP | 2018087839 A | 6/2018 |
| WO | 2014038434 A1 | 3/2014 |

OTHER PUBLICATIONS

Chinese Office Action (and English language translation thereof) dated Dec. 25, 2020 issued in Chinese Application No. 201910589182.3.

Japanese Office Action (and English language translation thereof) dated Jan. 28, 2021 issued in counterpart Japanese Application No. 2019-091588.

* cited by examiner

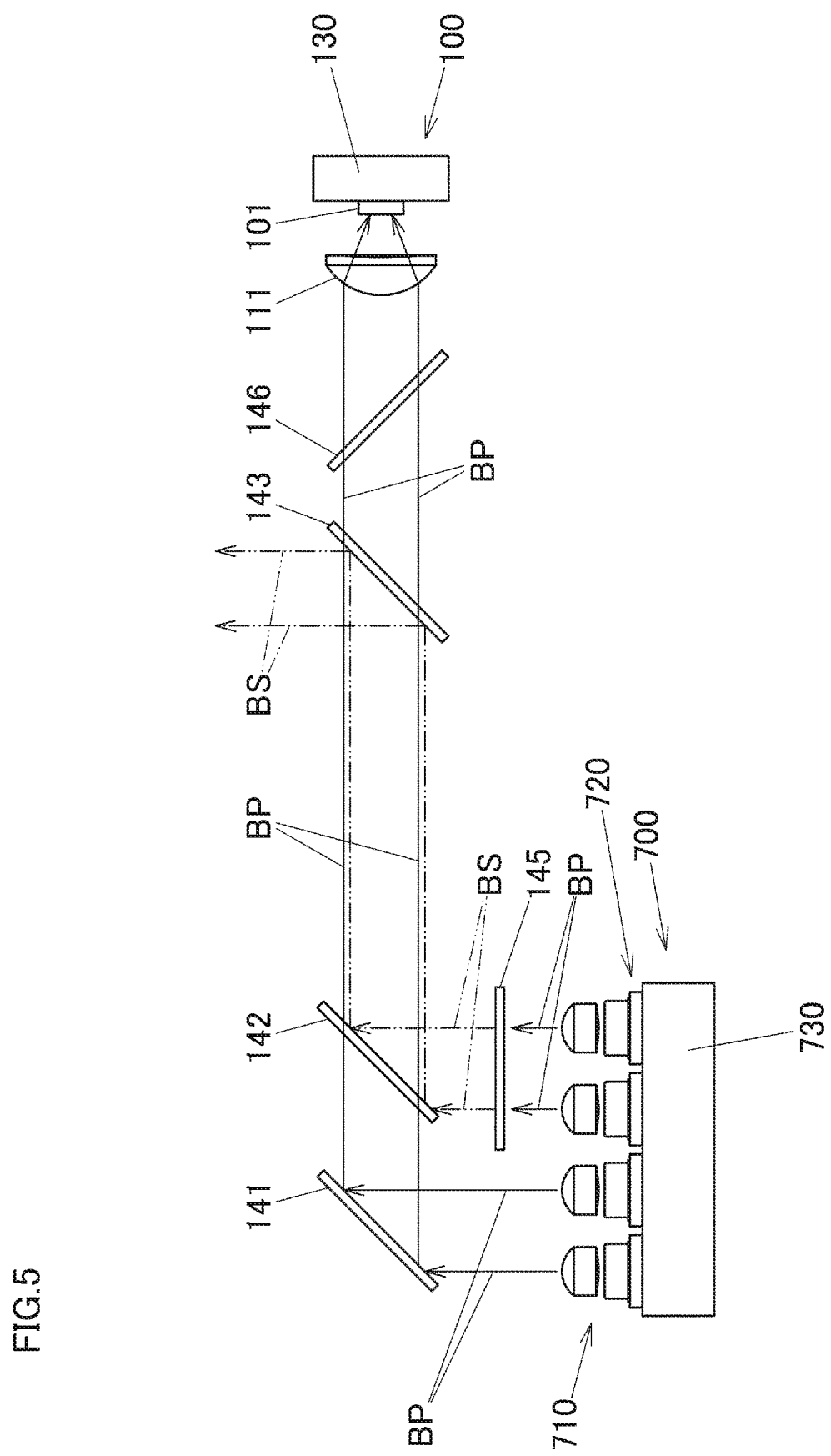

LIGHT SOURCE UNIT AND PROJECTOR

CROSS-REFERENCE TO RELATED APPLICATION

This patent application is based upon and claims the benefit of priority under 35 USC 119 from Japanese Patent Application No. 2018-125706 filed on Jul. 2, 2018 and No. 2019-091588 filed on May 14, 2019, the entire disclosures of which, including the descriptions, claims, drawings, and abstracts, are incorporated herein by reference in their entireties.

BACKGROUND OF THE INVENTION

Field of the Invention

The present invention relates to a light source unit and a projector including the light source unit.

Description of the Related Art

Data projectors are widely used on many occasions in these days as an image projector for projecting a screen of a personal computer, a video image, and further, an image based on image data recorded on a memory card or the like onto a screen. In these data projectors, light emitted from a light source is collected onto a micromirror display device called a digital micromirror device (DMD) or a liquid crystal panel so as to display a color image onto a screen.

Then, these projectors, which are image projectors, have been expanding their applications to fields from a presentation on a business scene to a home use as a result of propagation of video equipment such as personal computers and DVD players. Conventionally, in the mainstream of these projectors, high-luminance discharge lamps have been used as a light source. In recent years, however, various types of projectors have been developed in which semiconductor light emitting elements such as laser diodes are used as a light source and a luminescent plate is provided which uses these semiconductor light emitting elements as an excitation light source.

Japanese Patent Laid-Open No. 2017-116681 discloses a projector that includes an excitation light shining device including a blue laser diode that emits light having a wavelength in the red wavelength range or simply light in the red wavelength range, a luminescent plate that emits luminescent light having a wavelength in the green wavelength range or simply luminescent light in the green wavelength range by receiving excitation light from the excitation light shining device, a blue light source device that includes a blue laser diode prepared separately from that of the excitation light shining device, and a red light source device that includes a red laser diode. Additionally, Japanese Patent Laid-Open No. 2017-151293 discloses a projector that includes a red light source device that includes a red light emitting diode and a luminescent plate device that includes a luminescent wheel including a luminescent material layer configured to emit luminescent light in the green wavelength range by receiving, as excitation light, light having a wavelength in the blue wavelength range or simply light in the blue wavelength range emitted from an excitation light shining device including a blue laser diode and shined on thereto and a diffuse transmission area configured to transmit light emitted from the excitation light shining device while diffusing it.

There is a risk of the light source unit and the projector being increased in size by providing the blue light source device separately from the excitation light shining device including the blue laser diode as in the projector disclosed by Japanese Patent Laid-Open No. 2017-116681 or by making use of light in the blue wavelength range that has passed through the diffuse transmission area on the luminescent wheel as light source light by taking it back from a rear surface side of the luminescent wheel as in the projector disclosed in Japanese Patent Laid-Open No. 2017-151293.

SUMMARY OF THE INVENTION

The present invention has been made in view of the situations described above, and an object of the present invention is to provide a light source unit that is small in size and a projector including the light source unit.

According to an aspect of the present invention, there is provided a light source unit including a light source device including a first light source and a second light source that are held by a holding member, the first light source and the second light source each being configured to emit light in a predetermined polarizing direction, a first reflection device on which light from the first light source is incident, a second reflection device on which reflection light from the first reflection device and light from the second light source are incident, and a light source control device configured to selectively drive the first light source and the second light source in response to an input signal, wherein the first reflection device is formed so as to reflect light in the polarizing direction in light that is incident thereon from the first light source, and wherein the second reflection device is formed so as to transmit reflection light, that is, light in the polarizing direction of the first reflection device that is incident thereon and to reflect light in the polarizing direction in light that is incident thereon from the second light source.

According to another aspect of the present invention, there is provided a projector including the projector described above, a display device on to which light source light from the light source unit is shined to form image light, a projection optical system configured to project the image light on to a screen, and a projector control unit configured to control the display device and the light source unit.

BRIEF DESCRIPTION OF THE DRAWINGS

FIG. 5 is a schematic enlarged plan view illustrating the configuration of a main part according to a second embodiment of the present invention in an enlarged fashion.

DETAILED DESCRIPTION OF THE PREFERRED EMBODIMENT

First Embodiment

Figure 1:
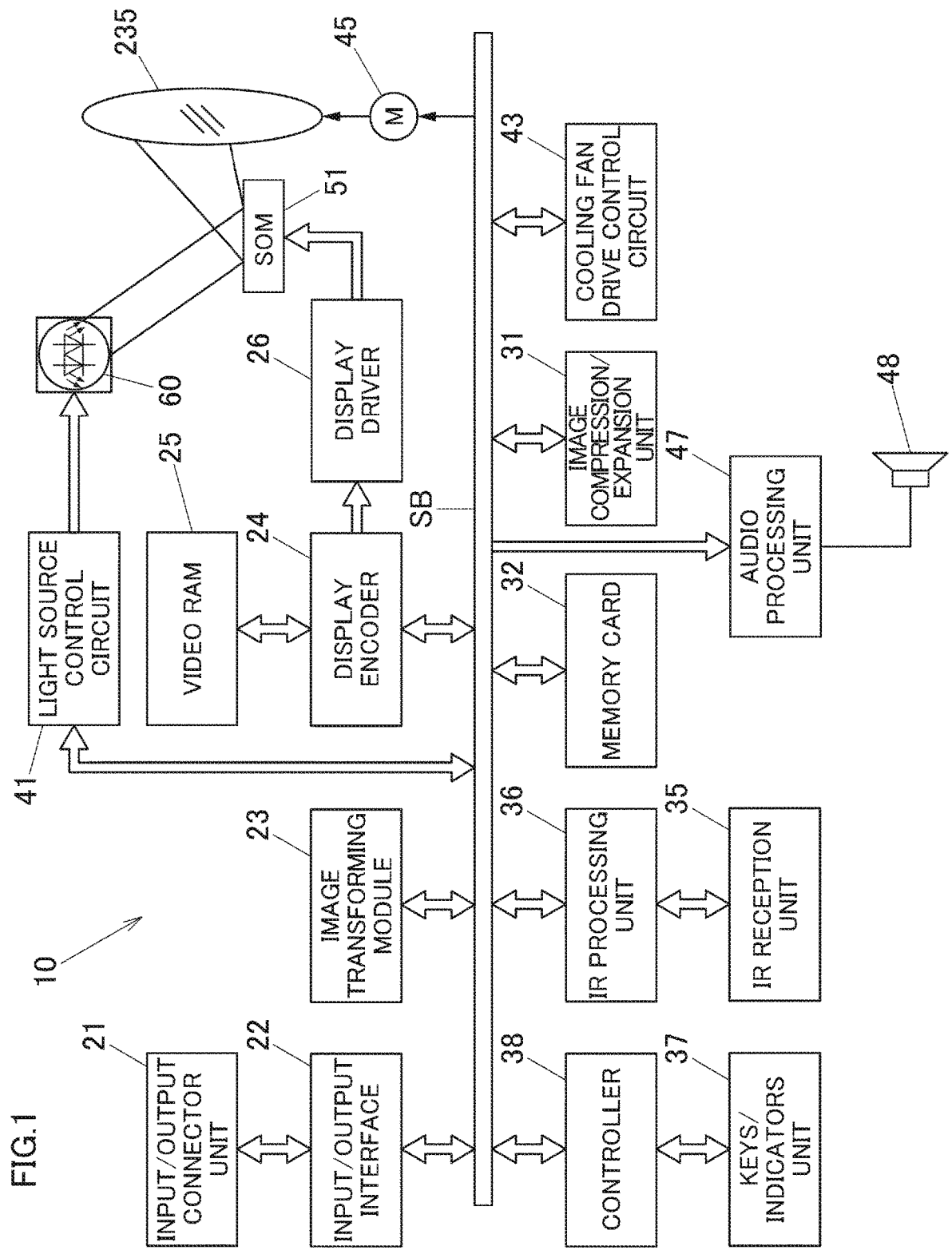
FIG. 1 is a block diagram illustrating functional blocks of a projector according to a first embodiment of the present invention.

Hereinafter, a first embodiment according to the present invention will be described based on drawings. FIG. 1 is a block diagram illustrating functional circuit blocks of a projector control unit of a projector 10. The projector control unit includes a controller 38, an input/output interface 22, an image transforming module 23, a display encoder 24, a display driver 26, and the like.

This controller 38 governs the control of operations of individual circuitries inside the projector 10 and includes CPU, ROM storing fixedly operation programs such as various settings, RAM that is used as a work memory, and the like.

Then, the controller 38 sends image signals of various standards which are inputted from an input/output connector unit 21 via the input/output interface 22 and a system bus (SB) to the image transforming module 23, where the image signals are transformed so as to be unified into an image signal of a predetermined format which is suitable for display. Thereafter, the controller 38 outputs the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller and drives a display device 51, which is a spatial optical modulator (SOM), at an appropriate frame rate corresponding to the image signal outputted from the display encoder 24.

Then, in the projector 10, pencils of light emitted from a light source unit 60 are shined on to the display device 51 by way of an optical system to form an optical image by reflecting light from the display device 51, and the image so formed is then projected onto a screen, not illustrated, for display by way of a projection optical system. A movable lens group 235 of the projection optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory card 32, which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Then, operation signals from a keys/indicators unit 37 including main keys and indicators which are provided on a casing of the projector 10 are sent out directly to the controller 38. Key operation signals from a remote controller are received by an IR reception unit 35 and are then demodulated into a code signal at an Ir processing unit 36 for output to the controller 38.

An audio processing unit 47 is connected to the controller 38 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which is configured as a light source control unit. The light source control circuit 41 controls individually a red light source device, a green light source device, and a blue light source device of the light source unit 60 so that light in predetermined wavelength ranges is emitted from the light source unit 60 so as to generate an image as required.

Further, the controller 38 causes a cooling fan drive control circuit 43 to detect temperatures through a plurality of temperature sensors which are provided in the light source unit 60 so as to control the revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
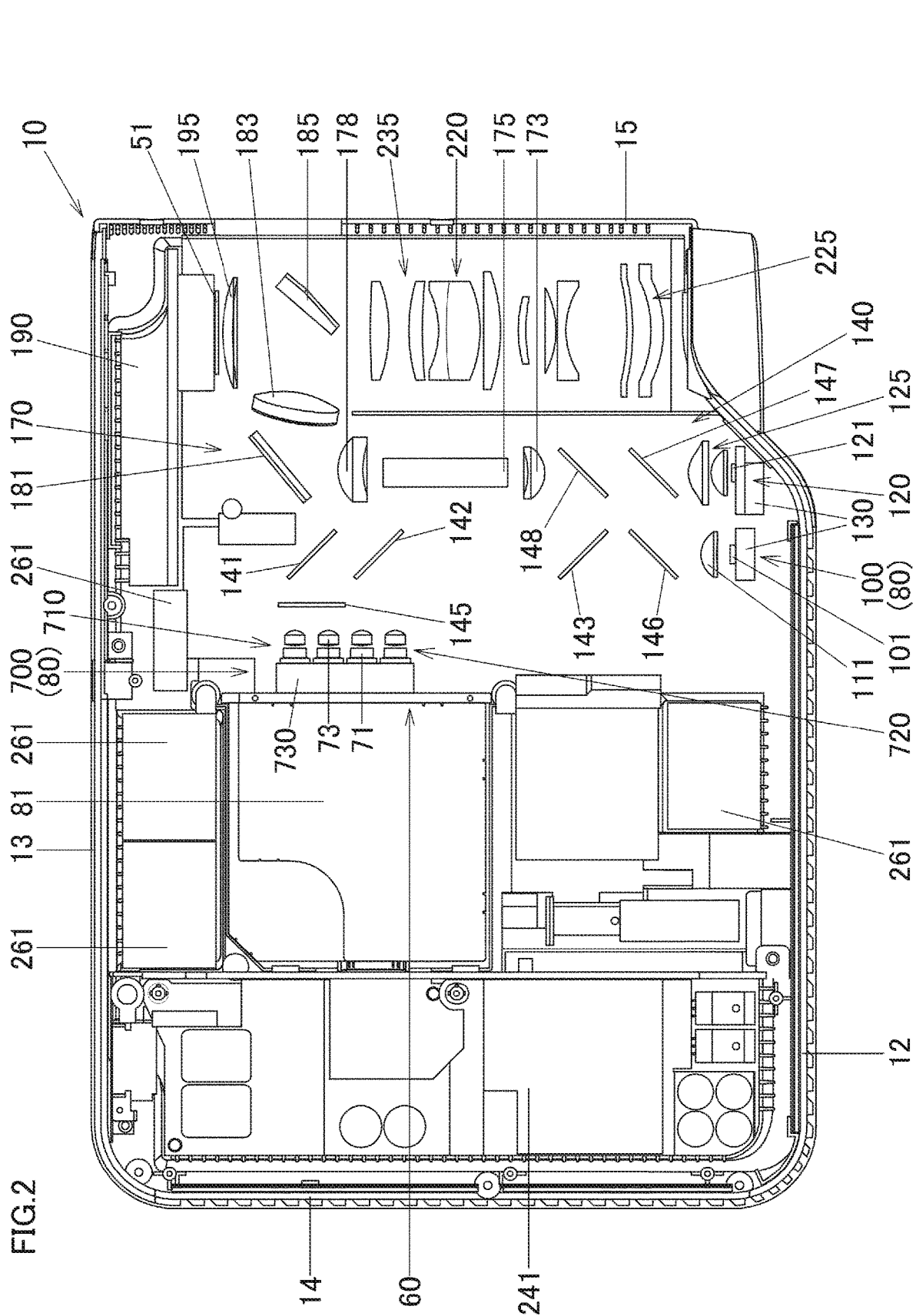
FIG. 2 is a schematic plan view illustrating an internal structure of the projector according to the first embodiment of the present invention.

Next, an internal structure of the projector 10 will be described. FIG. 2 is a schematic plan view illustrating the internal structure of the projector 10. Here, the casing of the projector 10 has a substantially box-like shape and includes an upper and lower panels, a front panel 12, a rear panel 13, a right panel 14, and a left panel 15. In the following description, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 includes a control circuit board 241 in the vicinity of the right panel 14. This control circuit board 241 includes a power supply circuit block, a light source control block, and the like. The projector 10 also includes the light source unit 60 to a side of the control circuit board 241, that is, at a substantially central portion of the casing of the projector 10. Further, the projector 10 includes a light source-side optical system 170 and a projection optical system 220 that are provided between the light source unit 60 and the left panel 15.

The light source unit 60 includes an excitation light shining device 700 that constitutes an excitation light source as well as a light source of light in the blue wavelength range, a red light source device 120 that constitutes a light source of light in the red wavelength range, and a green light source device 80 that constitutes a light source of light in the green wavelength range. The green light source device 80 is made up of the excitation light shining device 700 and a luminescent light emitting device 100. In the light source unit 60, a light guiding optical system 140 is disposed which guides light in the blue wavelength range, light in the green wavelength range, and light in the red wavelength range. The light guiding optical system 140 includes a half-wave plate 145, first to third reflection devices 141 to 143, and first to third dichroic mirrors 146 to 148, so that light rays in the blue, green and red wavelength ranges that are emitted from the excitation light shining device 700, the green light source device 80 and the red light source device 120, respectively, are collected to an incident port of a light tunnel 175.

The excitation light shining device 700, which constitutes a light source device, is disposed at a substantially central portion of the casing of the projector 10 in a left-right direction and in the vicinity of the rear panel 13. The excitation light shining device 700 includes a first light source 710 and a second light source 720. The first light source 710 and the second light source 720 each include a plurality of blue laser diodes 71. The pluralities of blue laser diodes 71 of the first light source 710 and the second light source 720 are held by a common holding member 730. Collimator lenses 73 are disposed individually on optical axes of the blue laser diodes so as to convert light emitted from the corresponding blue laser diodes 71 into parallel light to thereby enhance the directivity of the emitted light.

Figure 3:
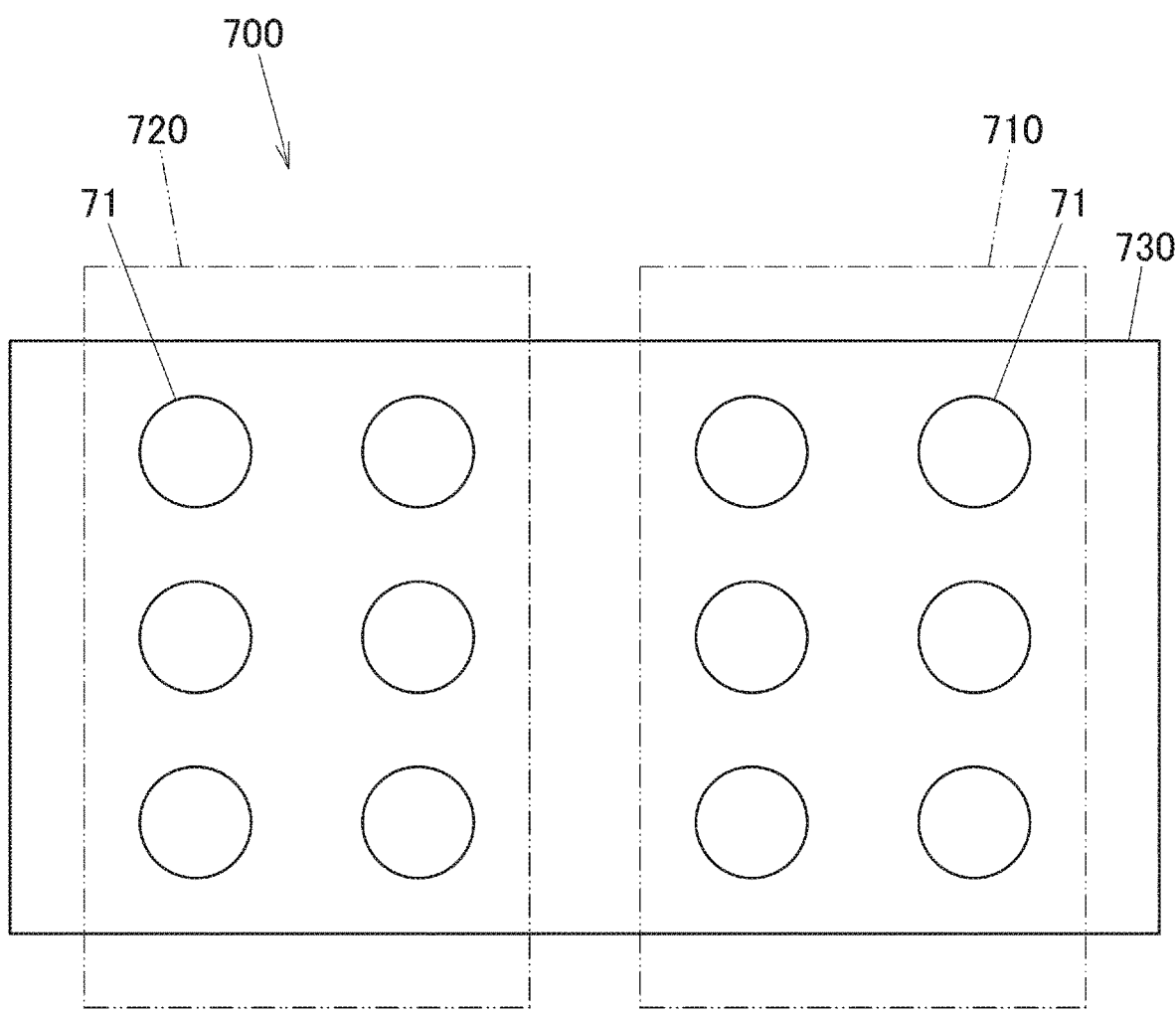
FIG. 3 is a schematic front view of an excitation light shining device according to the first embodiment of the present invention, as viewed from an emerging side of blue laser diodes.

As shown in FIG. 3, the pluralities of blue laser diodes 71 of the first light source 710 and the second light source 720 are arranged into a matrix configuration of three rows by four columns by the holding member 730. In FIG. 3, two right-hand side columns of blue laser diodes 71 (six in total) constitute the first light source 710, and two left-hand side columns of blue laser diodes 71 (six in total) constitute the second light source 720. The first light source 710 and the second light source 720 each emit light in a predetermined polarizing direction. In this embodiment, polarizing directions of all the blue laser diodes of the first light source 710 and the second light source 720 are arranged so as to complete the same S-polarized light relative to the first reflection device 141 and the second reflection device 142. Consequently, the first light source and the second light source both emit S-polarized light in the blue wavelength range.

Returning to FIG. 2, a heat sink 81, which connects to the holding member 730, is provided at a side of the holding member 730 that faces the right panel 14 for the excitation light shining device 700. A cooling fan 261 is disposed between the heat sink 81 and the rear panel 13, and the blue laser diodes 71 are cooled by this cooling fan 261 and the heat sink 81. Further, a cooling fan 261 is also disposed between the excitation light shining device 700 and the rear panel 13, and the half-wave plate 145, which will be described later, the first reflection device 141, and the second reflection device 142 are cooled by this cooling fan 261.

The half-wave plate 145 is disposed in such a manner as to correspond to the first light source 710 on a side of the excitation light source 700 that faces the left panel 15 (in other words, the half-wave plate 145 is disposed on an optical path between the first light source 710 and the first reflection device 141, which will be described later). Further, the first reflection device 141 and the second reflection device 142 are disposed in such a manner as to correspond to the first light source 710 and the second light source 720, respectively, on a side of the half-wave plate 145 that faces the left panel 15. The first reflection device 141 is formed so as to reflect light in the polarizing direction in light that is incident thereon from the first light source 710. The second reflection device 142 is formed so as to transmit reflection light, that is, light in the polarizing direction of the first reflection device that is incident thereon and to reflect light in the polarizing direction in light that is incident thereon from the second light source 720. In this embodiment, the first reflection device 141 is a reflection mirror, and the second reflection device 142 is a polarizing beam splitter (PBS) that is configured to transmit P-polarized light and reflect S-polarized light. A polarizing beam splitter of a flat plate type made up of a flat sheet of glass can be used in which a dielectric multilayer coat is applied to a splitting plane. Additionally, a polarizing beam splitter of a cube type may be used in which a right-angle prism to which a dielectric multilayer coat is applied and a right-angle prism to which no dielectric multilayer coat is applied are laminated together. The first reflection device 141 and the second reflection device 142 are disposed so as to shift the axis of reflection light that is reflected by both the reflection devices through 90 degrees towards the front panel 12. In this way, the reflection light of the first reflection device 141 and the reflection light reflected by the second reflection device 142 are incident on the same optical path.

Figure 4:
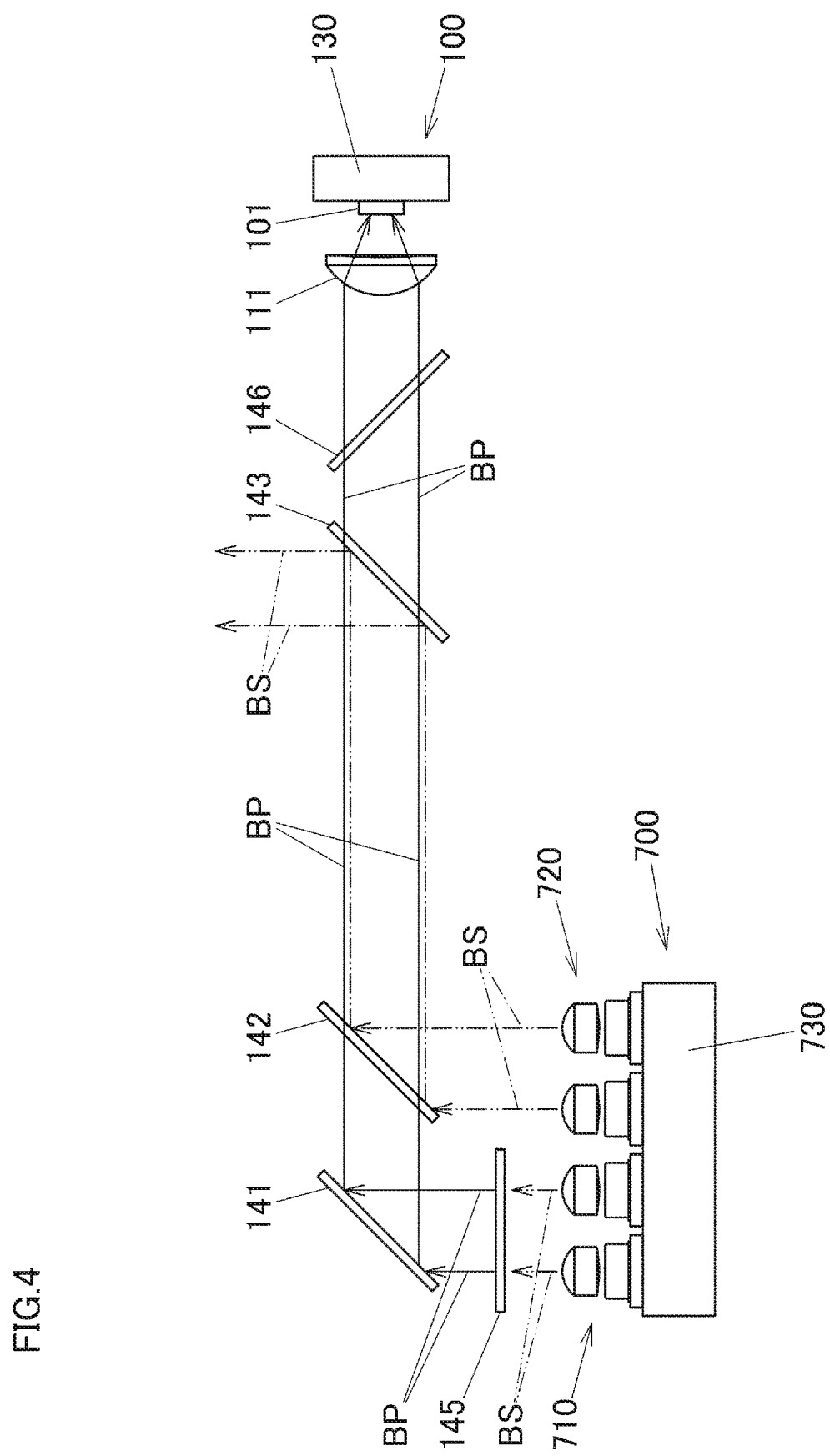
FIG. 4 is a schematic enlarged plan view illustrating the configuration of a main part according to the first embodiment of the present invention in an enlarged fashion.

As shown in FIG. 4, light from the first light source 710 is incident on the first reflection device 141 by way of the half-wave plate 145. Here, since the first light source 710 emits S-polarized light in the blue wavelength range BS, the light from the first light source 710 is converted into P-polarized light in the blue wavelength range BP by the half-wave plate 145. Consequently, the first reflection device 141 reflects P-polarized light in the blue wavelength range BP, and hence, reflection light from the first reflection device 141 constitutes P-polarized light in the blue wavelength range BP. On the other hand, reflection light (P-polarized light in the blue wavelength range BP) of the first reflection device 141 and light (S-polarized light in the blue wavelength range BS) from the second light source 720 are incident on the second reflection device 142. The second reflection device 142 transmits the reflection light from the first reflection device 141, which is the P-polarized light in the blue wavelength range BP, and outputs it towards the front panel 12. Additionally, the second reflection device 142 reflects light from the second light source 720 which is S-polarized light in the blue wavelength range BS towards the front panel 12.

Also, as shown in FIGS. 2 and 4, the third reflection device 143 is disposed on a side of the second reflection device 142 that faces the front panel 12. The third reflection device 143 is made up of a polarizing beam splitter configured to transmit P-polarized light in the blue wavelength range BP that is reflection light reflected by the first reflection device 141 and having passed through the second reflection device 142 and reflect S-polarized light in the blue wavelength range BS reflected by the second reflection device 142 so as to deviate from the optical path.

A first dichroic mirror 146 (a fourth reflection device) is disposed on a side of the third reflection device 143 that faces the front panel 12, and this first dichroic mirror 146 is configured to transmit light in the blue wavelength range and reflect light in the green wavelength range towards the left panel 15. The luminescent light emitting device 100 of the green light source device 80 is provided on a side of the first dichroic mirror 146 that faces the front panel. In this way, light (P-polarized light in the blue wavelength range BP) that has passed through the second reflection device 142 passes the third reflection device 143 and is then incident on a luminescent plate 101 (a luminescent portion) of the luminescent light emitting device 100 as excitation light. Then, light excited on the luminescent plate 101 is shifted by the first dichroic mirror 146 disposed between the third reflection device 143 and the luminescent plate 101 so as to deviate from the optical path.

The luminescent light emitting device 100 of the green light source device 80 includes the luminescent plate 101, and a collective lens 111. The luminescent plate 101 is disposed in such a manner as to become parallel to the front panel 12, that is, in such a manner as to be at right angles to the axis of P-polarized light in the blue wavelength range, which is excitation light that has passed through the first dichroic mirror 146. The collective lens 111 not only collects excitation light to be shined on to the luminescent plate 101 but also collects a pencil of light that the luminescent plate 101 emits towards the rear panel 13. A heat sink 130 is disposed between the luminescent plate 101 and the front panel 12. A cooling fan 261 disposed on a side of the luminescent light emitting device 100 that faces the right panel 14 cools this heat sink 130 and a heat sink 130 of the red light source device 120, which will be described later, whereby the luminescent plate 101 and a red light source 121 are cooled.

The luminescent plate 101 is formed of, for example, a plate-like metallic base material. A surface of the metallic base material of the luminescent plate 101 constitutes a reflection surface that reflects light. A luminescent light emitting area is laid out on this reflection surface. A luminescent material is provided on the luminescent light emitting area, and the luminescent material emits luminescent light in the green wavelength range by being excited by light, as excitation light, emitted from the second light source 720 of the excitation light shining device 700, reflected by the second reflection device 142, and having passed through the third reflection device 143 and the first dichroic mirror 146. The reflection surface can be formed by being mirror finished through silver deposition or the like.

The luminescent material emits luminescent light in every direction when it is illuminated by excitation light. A portion of the luminescent light so emitted is emitted directly to the collective lens 111, and the other portion of the luminescent light emitted is reflected on the reflection surface of the luminescent plate 101 and is thereafter emitted to the collective lens 111.

Additionally, excitation light shined on to the metallic base material without exciting the luminescent material is reflected by the reflection surface and is then incident on the luminescent material again to excite the luminescent material. Due to this, the utilization efficiency of excitation light emitted from the excitation light shining device 700 can be enhanced by the reflection surface of the luminescent plate 101, whereby light in the green wavelength range can be emitted more brightly.

As illustrated in FIG. 2, a second dichroic mirror 147 is disposed on a side of the first dichroic mirror 146 that faces the left panel 15. The second dichroic mirror 147 is configured to reflect light in the green wavelength range that is reflected by the first dichroic mirror 146 towards the rear panel 13 by turning the axis of the light in the green wavelength range so reflected through 90 degrees and transmit light in the red wavelength range. The red light source device 120 is disposed on a side of the second dichroic mirror 147 that faces the front panel 12.

The red light source device 120 includes the red light source 121 that is disposed in such a manner as to emit light towards the rear panel 13 and a collective lens group 125 configured to collect light emitted from the red light source 121. This red light source 121 is a red light emitting diode, which is a semiconductor light emitting element configured to emit light in the red wavelength range. The red light source device 120 includes a heat sink 130 that is disposed on a side of the red light source 121 that faces the front panel 12.

A third dichroic mirror 148 is disposed on a side of the second dichroic mirror 147 that faces the rear panel 13. The third dichroic mirror 148 reflects S-polarized light in the blue wavelength range reflected by the third reflection device 143 towards the rear panel 13 by turning the axis of the S-polarized light in the blue wavelength range through 90 degrees and transmits light in the green wavelength range that is reflected by the second dichroic mirror 147 and light in the red wavelength range that passes through the second dichroic mirror 147. In this way, the axis of the S-polarized light in the blue wavelength range and the axis of the S-polarized light in the green wavelength range are aligned in the same direction by the third dichroic mirror 148 and are then collected to the entrance port of the light tunnel 175 via a collective lens 173 of the light source-side optical system 170.

The light source-side optical system 170 is made up of the collective lens 173, the light tunnel 175, a collective lens 178, a light axis turning mirror 181, a collective lens 183, a shining mirror 185, and a condenser lens 195. Since the condenser lens 195 emits image light emitted from the display device 51 disposed on a side of the condenser lens 195 that faces the rear panel 13 towards the projection optical system 220, the condenser lens 195 is also understood to constitute part of the projection optical system 220.

The collective lens 173 is disposed in the vicinity of the light tunnel 175, and this collective lens 173 collects light source light to the incident port of the light tunnel 175. Thus, light in the red wavelength range, light in the green wavelength range, and light in the blue wavelength range are collected by the collective lens 173 and are then caused to be incident on the light tunnel 175. A pencil of light that is so incident on the light tunnel 175 is then converted into a pencil of light whose light intensity distribution is made more uniform by the light tunnel 175.

The light axis turning mirror 181 is disposed on an optical axis on a side of the light tunnel 175 that faces the rear panel 13 via the collective lens 178. A pencil of light that is emitted from an emerging port of the light tunnel 175 is collected by the collective lens 178, and thereafter, the axis of the pencil of light is turned towards the left panel 15 by the light axis turning mirror 181.

The pencil of light reflected by the light axis turning mirror 181 is collected by the collective lens 183 and is then shined on to the display device 51 at a predetermined angle via the condenser lens 195 by the shining mirror 185. A heat sink 190 is provided at a side of the display device 51, which is DMD, that faces the rear panel 13, and the display device 51 is cooled by this heat sink 190.

The pencil of light, which is light source light shined on to an image forming plane of the display device 51 by the light source-side optical system 170, is reflected on the image forming plane of the display device and is then projected on to a screen by way of the projection optical system 220 as projected light. Here, the projection optical system 220 is made up of the condenser lens 195, the movable lens group 235, and a fixed lens group 225. The movable lens group 235 is configured to be moved by the lens motor. Then, the movable lens group 235 and the fixed lens group 225 are installed in a fixed lens barrel. Thus, the fixed lens barrel installing the movable lens group 235 is made into a variable-focus lens enabling a zooming control and a focusing control.

By configuring the projector 10 in the way described heretofore, the first light source 710 and the second light source 720 of the excitation light shining device 700 and the red light source device 120 are driven selectively in response to an image signal inputted by way of the input/output interface 22. Then, light is emitted from the first light source 710, the second light source 720, and the red light source device 120 at different timings. Then, light in the red wavelength range, light in the green wavelength range, and light in the blue wavelength range that are emitted from the first light source 710 of the excitation light shining device 700, which is the blue light source, the green light source device 80, and the red light source device 120, respectively, are incident sequentially on the collective lens 173 and the light tunnel 175 by way of the light guiding optical system 140 and are further incident on the display device 51 by way of the light source-side optical system 170. Then, the display device 51, which is the DMD, of the projector 10 displays red light, green light and blue light according to data in a time-sharing fashion, whereby a color image can be projected on to the screen.

Second Embodiment

In the first embodiment, all the blue laser diodes 71 of the first light source 710 and the second light source 720 of the excitation light shining device 700 are arranged so that the polarizing directions of light rays emitted therefrom complete the S-polarized light. In contrast to this, in a second embodiment, all blue laser diodes 71 are arranged so that light rays emitted therefrom complete P-polarized light. Then, a half-wave plate 145 is disposed between a second reflection device 142 and a second light source 720. Hereinafter, only different points from the first embodiment will be described. FIG. 5 illustrates the configuration of a main part according to the second embodiment in an enlarged fashion.

P-polarized light in the blue wavelength range BP emitted from the blue laser diodes 71 of the first light source 710 of the excitation light shining device 700 is reflected by a first reflection device 141. The half-wave plate 145 is disposed on an optical path of the second light source 720 of the excitation light shining device 700. Consequently, P-polarized light in the blue wavelength range BP emitted from the blue laser diodes 71 disposed on the second light source 720 is converted into S-polarized light BS in the blue wavelength range.

Next, the S-polarized light in the blue wavelength range BS, which is emitted from the blue laser diodes 71 of the second light source 720 and are then converted so, is reflected by the second reflection device 142. On the other hand, the P-polarized light in the blue wavelength range BP reflected by the first reflection device 141 passes through the second reflection device 142. In this way, the P-polarized light in the blue wavelength range BP reflected by the first reflection device 141 and the S-polarized light in the blue wavelength range BS reflected by the second reflection device 142 are caused to pass through the same optical path.

Modified Example

Additionally, a configuration can also be adopted in which blue laser diodes 71 of a first light source 710 and blue laser diodes 71 of a second light source 720 are disposed so that either of the blue laser diodes 71 of the first light source 710 and the blue laser diodes 71 of the second light source 720 emit P-polarized light, while the other of the blue laser diodes 71 of the first light source 710 and the blue laser diodes 71 of the second light source 720 emit S-polarized light. In this case, a half-wave plate 145 is excluded, and a second reflection device 142 only needs to change directions of the S-polarized light and the P-polarized light that the second reflection device 142 reflects and transmits as required. That is, a configuration only needs to be adopted in which a phase difference of 90 degrees is produced between a polarizing direction of light from the first light source 710 that is incident on the first reflection device 141 and a polarizing direction of light from the second light source 720 that is incident on the second reflection device 142. Thus, the second reflection device 142 only needs to be configured so as to transmit light from the first reflection device 141 and reflect light from the second light source 720.

Thus, according to the embodiments of the present invention, the light source unit 60 includes the excitation light shining device 700 including in turn the first light source 710 that emits light in the predetermined polarizing direction and the second light source 720 that emits light in the predetermined polarizing direction, the first reflection device 141 on which light from the first light source 710 is incident, and the second reflection device 142 on which the reflection light from the first reflection device 141 and light from the second light source 720 are incident. Then, the first reflection device 141 is configured to reflect light in the polarizing direction in light emitted from the first light source 710, and the second reflection device 142 is configured to transmit the reflection light, that is, the P-polarized light from the first reflection device 141 that is incident thereon and reflect the S-polarized light in light that is incident thereon from the second light source 720.

As a result, even when light emitted from the excitation light shining device 700 is used as excitation light and light source light, a long optical path along which initially emitted light travels to be taken out as light source light does not have to be provided, and a light source for emitting light in the same wavelength range does not have to be provided, either. Thus, the light source unit 60 that is miniaturized can be provided. Further, the polarizing beam splitter is used as the second reflection device 142, and therefore, transmitting P-polarized light and reflecting S-polarized light can be more efficient than transmitting S-polarized light and reflecting P-polarized light. In addition, preparing the second reflection device 142 that transmits P-polarized light and reflects S-polarized light is relatively easier than preparing a device that transmits S-polarized light and reflects P-polarized light.

Reflection light of the first reflection device 141 and reflection light reflected by the second reflection device 142 are incident on the same optical path. As a result, since light from the first light source 710 and light from the second light source 720 can be guided into the same optical path, optical members for guiding light can be communized, thereby making it possible to miniaturize the light source unit 60.

The light source unit 60 includes further the third reflection device 143 that transmits reflection light from the first reflection device 141 on the optical path and reflects reflection light from the second reflection device 142 and the luminescent material portion (the luminescent plate 101) on which light from the first reflection device 141 that has passed through the third reflection device 143 is incident. As a result, light in the blue wavelength range emitted from the excitation light shining device 700 is caused to deviate from the optical path for separation, whereby the blue light source and excitation light can both be obtained. Since the polarizing bean splitter is used as the third reflection device 143, transmitting P-polarized light and reflecting S-polarized light can be more efficient than transmitting S-polarized light and reflecting P-polarized light. Preparing the third reflection device 143 that is the polarizing beam splitter that transmits P-polarized light and reflects S-polarized light is relatively easier than preparing a device that transmits S-polarized light and reflects P-polarized light.

The light source unit 60 includes the fourth reflection device (the first dichroic mirror 146) that is disposed between the third reflection device 143 and the luminescent material portion (the luminescent plate 101) so as to shift light excited by the luminescent material portion (the luminescent plate 101) from the optical path for separation. As a result, light in the green wavelength range emitted from the luminescent light emitting device 100 can be made use of as a light source.

The first light source 710 is disposed so as to emit light in the same polarizing direction as light emitted from the second light source 720, and the half-wave plate 145 is disposed on the optical path between the first light source 710 and the first reflection device 141 or the second light source 720 and the second reflection device 142. As a result, since the blue laser diodes 71 can be disposed on the holding member 730 by changing the polarizing directions of the blue laser diodes 71, the assemblage and wiring of the blue laser diodes 71 can be facilitated.

The blue laser diodes 71 can also be disposed so that the phase difference of 90 degrees can be produced between light emitted from the first light source 710 and light emitted from the second light source 720. As a result, the half-wave plate 145 can be excluded, whereby the configuration of the light source unit 60 can be simplified.

The phase difference of 90 degrees is produced between the polarizing direction of light from the first light source 710 that is incident on the first reflection device 141 and the polarizing direction of light from the second light source 720 that is incident on the second reflection device 142. As a result, light emitted from the excitation light shining device 700 can be used as both excitation light and the blue light source, whereby the light source unit 60 can be miniaturized.

The light source unit 60 includes the third reflection device 143 configured to reflect or transmit light that has passed through the second reflection device 142 and transmit or reflect light reflected by the second reflection device 142. As a result, one of light rays emitted from the second reflection device 142 and having the different polarizing directions can be made use of as light source light, and the other light ray can be separated as excitation light.

The light source unit 60 includes the first dichroic mirror 146 configured to transmit or reflect light passing through or reflected by the third reflection device 143 so as to shine the light on the luminescent plate 101 as excitation light and reflect or transmit luminescent light from the luminescent plate 101. As a result, bright luminescent light can be made use of as light source light.

Light emitted from the first light source 710 and light emitted from the second light source 720 can constitute light in the same wavelength range, that is, light in the blue wavelength range. As a result, the excitation light shining device 700 that emits light that can be used as excitation light and light source light can be made up entirely by using the same blue laser diodes, thereby making it possible to reduce the production costs.

Light emitted from the first light source 710 and the second light source 720 is light in the blue wavelength range, and luminescent light emitted from the luminescent plate 101 is light in the green wavelength range. Consequently, by adding separately the red light source device 120 that emits light in the red wavelength range, the miniaturized light source unit 60 can be provided which includes the light sources of the three colors.

Light emitted from the first light source 710 and light emitted from the second light source 720 may constitute light rays in different wavelength ranges or light rays of different polarizing directions. As a result, since an optical path can be made up without using a wave plate, a reduction in size of the whole of the projector can be realized.

The projector 10 includes the light source unit 60, the display device 51, the projection optical system 220, and the projector control unit. As a result, the miniaturized projector 10 including the light source unit 60 can be provided. In the embodiments of the present invention, while the DMD is used as the display device 51, the display device 51 may be made up of a 3-LCD projector employing a transmission LCD optical modulator.

While the embodiments of the present invention have been described heretofore, the embodiments are presented as examples, and hence, there is no intention to limit the scope of the present invention by these embodiments. These novel embodiments can be carried out in other various forms, and various omissions, replacements and modifications can be made to the embodiments without departing from the spirit and scope of the invention. Those resulting embodiments and their modifications are included in the spirit and scope of the present invention and are also included in the scope of inventions claimed for patent under claims below and their equivalents.

What is claimed is:

1. A light source unit, comprising:
    a light source device comprising a first light source and a second light source that are held by a holding member, wherein light emission directions of the first and second light source devices are substantially parallel to each other, and the first light source and the second light source each emit light in a predetermined polarizing direction;
    a first reflection device on which the light from the first light source is incident;
    a second reflection device on which reflection light from the first reflection device and the light from the second light source are incident;
    a light source control device which selectively drives the first light source and the second light source in response to an input signal;
    a third reflection device which shifts the reflection light of the first reflection device from the optical path for separation and transmits the reflection light of the second reflection device; and
    a luminescent material portion on which the reflection light of the second reflection device that has passed through the third reflection device is incident,
    wherein the first reflection device is formed so as to reflect light in the polarizing direction in light that is incident thereon from the first light source,
    wherein the second reflection device transmits the reflection light reflected by the first reflection device, the reflection light being polarized in the predetermined polarizing direction,
    wherein the second reflection device transmits P-polarized light and reflects S-polarized light,
    wherein the second reflection device reflects light in the polarizing direction in light that is incident thereon from the second light source, and
    wherein the reflection light of the first reflection device and reflection light reflected by the second reflection device are on a same optical path.

2. A light source unit, comprising:
    a light source device comprising a first light source and a second light source that are held by a holding member, wherein light emission directions of the first and second light source devices are substantially parallel to each other, and the first light source and the second light source each emit light in a predetermined polarizing direction;
    a first reflection device on which the light from the first light source is incident;

a second reflection device on which reflection light from the first reflection device and the light from the second light source are incident;
a light source control device which selectively drives the first light source and the second light source in response to an input signal;
a third reflection device which shifts the reflection light of the first reflection device from the optical path for separation and transmits the reflection light of the second reflection device; and
a luminescent material portion on which the reflection light of the second reflection device that has passed through the third reflection device is incident,
wherein the first reflection device is formed so as to reflect light in the polarizing direction in light that is incident thereon from the first light source,
wherein the second reflection device transmits the reflection light reflected by the first reflection device, the reflection light being polarized in the predetermined polarizing direction,
wherein the second reflection device reflects light in the polarizing direction in light that is incident thereon from the second light source, and
wherein the reflection light of the first reflection device and reflection light reflected by the second reflection device are on a same optical path.

3. The light source unit according to claim 2, wherein the second reflection device transmits P-polarized light and reflects S-polarized light.

4. The light source unit according to claim 2, further comprising:
a fourth reflection device which shifts light excited at the luminescent material portion from the optical path for separation, the fourth reflection device being disposed between the third reflection device and the luminescent material portion.

5. The light source unit according to claim 2,
wherein the light emitted from the first light source has a same polarizing direction as the light emitted from the second light source, and
wherein a half-wave plate is disposed on an optical path between the first light source and the first reflection device or between the second light source and the second reflection device.

6. The light source unit according to claim 2, wherein the light emitted from the first light source has a phase difference of 90 degrees relative to the light emitted from the second light source.

7. The light source unit according to claim 2, wherein a polarizing direction of the light from the first light source that is incident on the first reflection device has a difference of 90 degrees relative to a polarizing direction of the light from the second light source that is incident on the second reflection device.

8. The light source unit according to claim 2, wherein the third reflection device is configured to reflect or transmit light that has passed through the second reflection device and transmit or reflect light reflected by the second reflection device.

9. The light source unit according to claim 8, wherein the third reflection device transmits P-polarized light and reflects S-polarized light.

10. The light source unit according to claim 8, further comprising:
a fourth reflection device configured to transmit or reflect light having passed through or been reflected by the third reflection device onto the luminescent material portion as excitation light and reflect or transmit luminescent light emitted from the luminescent material portion.

11. The light source unit according to claim 2, wherein the light emitted from the first light source and the light emitted from the second light source are in a same wavelength range.

12. The light source unit according to claim 11, wherein the light emitted from the first light source and the light emitted from the second light source constitute light in a blue wavelength range.

13. The light source unit according to claim 10, wherein the luminescent material portion emits luminescent light in a green wavelength range.

14. A projector comprising:
the light source unit according to claim 2;
a display device onto which light source light from the light source unit is shined to form image light;
a projection optical system which projects the image light onto a screen; and
a projector control unit which controls the display device and the light source unit.

15. A light source unit, comprising:
a light source device comprising a first light source and a second light source that are held by a holding member, wherein light emission directions of the first and second light source devices are substantially parallel to each other, and the first light source and the second light source each emit light in a predetermined polarizing direction;
a first reflection device on which the light from the first light source is incident;
a second reflection device on which reflection light from the first reflection device and the light from the second light source are incident;
a light source control device which selectively drives the first light source and the second light source in response to an input signal;
a third reflection device configured to reflect or transmit light that has passed through the second reflection device and transmit or reflect light reflected by the second reflection device;
a luminescent device configured to emit luminescent light; and
a fourth reflection device configured to transmit or reflect light having passed through or been reflected by the third reflection device onto the luminescent device as excitation light and reflect or transmit the luminescent light from the luminescent device,
wherein the first reflection device is formed so as to reflect light in the polarizing direction in light that is incident thereon from the first light source, and
wherein the second reflection device transmits the reflection light reflected by the first reflection device, the reflection light being polarized in the predetermined polarizing direction.

16. The light source unit according to claim 15, wherein the second reflection device transmits P-polarized light and reflects S-polarized light.

17. The light source unit according to claim 15,
wherein the second reflection device reflects light in the polarizing direction in light that is incident thereon from the second light source, and
wherein the reflection light of the first reflection device and reflection light reflected by the second reflection device are on a same optical path.

18. The light source unit according to claim 16,
wherein the second reflection device reflects light in the polarizing direction in light that is incident thereon from the second light source, and
wherein the reflection light of the first reflection device and reflection light reflected by the second reflection device are on a same optical path.

19. The light source unit according to claim 17, further comprising:
a third reflection device which shifts the reflection light of the first reflection device from the optical path for separation and transmits the reflection light of the second reflection device; and
a luminescent material portion on which the reflection light of the second reflection device that has passed through the third reflection device is incident.

20. The light source unit according to claim 18, further comprising:
a third reflection device which shifts the reflection light of the first reflection device from the optical path for separation and transmits the reflection light of the second reflection device; and
a luminescent material portion on which the reflection light of the second reflection device that has passed through the third reflection device is incident.

21. The light source unit according to claim 19, further comprising:
a fourth reflection device which shifts light excited at the luminescent material portion from the optical path for separation, the fourth reflection device being disposed between the third reflection device and the luminescent material portion.

22. The light source unit according to claim 20, further comprising:
a fourth reflection device which shifts light excited at the luminescent material portion from the optical path for separation, the fourth reflection device being disposed between the third reflection device and the luminescent material portion.

23. The light source unit according to claim 15,
wherein the light emitted from the first light source has a same polarizing direction as the light emitted from the second light source, and
wherein a half-wave plate is disposed on an optical path between the first light source and the first reflection device or between the second light source and the second reflection device.

24. The light source unit according to claim 16,
wherein the light emitted from the first light source has a same polarizing direction as the light emitted from the second light source, and
wherein a half-wave plate is disposed on an optical path between the first light source and the first reflection device or between the second light source and the second reflection device.

25. The light source unit according to claim 15, wherein the light emitted from the first light source has a phase difference of 90 degrees relative to the light emitted from the second light source.

26. The light source unit according to claim 16, wherein the light emitted from the first light source has a phase difference of 90 degrees relative to the light emitted from the second light source.

27. The light source unit according to claim 15, wherein a polarizing direction of the light from the first light source that is incident on the first reflection device has a difference of 90 degrees relative to a polarizing direction of the light from the second light source that is incident on the second reflection device.

28. The light source unit according to claim 15, wherein the third reflection device transmits P-polarized light and reflects S-polarized light.

29. The light source unit according to claim 15, wherein the light emitted from the first light source and the light emitted from the second light source are in a same wavelength range.

30. The light source unit according to claim 29, wherein the light emitted from the first light source and the light emitted from the second light source constitute light in a blue wavelength range.

31. The light source unit according to claim 15, wherein the luminescent device emits luminescent light in a green wavelength range.

32. A projector comprising:
the light source unit according to claim 15;
a display device onto which light source light from the light source unit is shined to form image light;
a projection optical system which projects the image light onto a screen; and
a projector control unit which controls the display device and the light source unit.

* * * * *